United States Patent [19]

Mechtersheimer

[11] Patent Number: 4,960,570

[45] Date of Patent: Oct. 2, 1990

[54] OZONE GENERATOR

[75] Inventor: Günter Mechtersheimer, Nussbaumen, Switzerland

[73] Assignee: Asea Brown Boveri Ltd, Baden, Switzerland

[21] Appl. No.: 398,400

[22] Filed: Aug. 25, 1989

[30] Foreign Application Priority Data

Sep. 9, 1988 [CH] Switzerland .................. 3383/88

[51] Int. Cl.$^5$ .............................................. B01J 19/08
[52] U.S. Cl. ........................ 422/186.21; 422/186.07; 204/164; 204/176; 204/178
[58] Field of Search ............... 422/186.07, 186.18, 422/186.19, 186.21; 204/164, 176, 178

[56] References Cited

U.S. PATENT DOCUMENTS

| 2,811,217 | 10/1957 | Steltz et al. | 183/2.5 |
|---|---|---|---|
| 4,283,291 | 9/1981 | Lowther | 422/186.15 |
| 4,504,446 | 3/1985 | Kunicki et al. | 422/186.19 |
| 4,654,199 | 3/1987 | Gloor et al. | 422/186.19 |
| 4,666,679 | 5/1987 | Masuda et al. | 422/186.2 |
| 4,690,803 | 9/1987 | Hirth | 422/186.18 |
| 4,693,870 | 9/1987 | Gloor et al. | 422/186.19 |
| 4,774,062 | 9/1988 | Heinmann | 422/186.19 |
| 4,818,498 | 4/1989 | Bachhofer et al. | 422/186.2 |

FOREIGN PATENT DOCUMENTS

| 2436914 | 2/1975 | Fed. Rep. of Germany . |
|---|---|---|
| 2357392 | 5/1975 | Fed. Rep. of Germany . |
| 3422989 | 12/1985 | Fed. Rep. of Germany . |
| 3521985 | 11/1986 | Fed. Rep. of Germany . |
| 648534 | 3/1985 | Switzerland . |

OTHER PUBLICATIONS

Chemical Abstracts, vol. 105, No. 4, Jul. 28, 1986, (Columbus, Ohio, U.S.), p. 141, Abstract 26585f.

Primary Examiner—Stephen J. Lechert, Jr.
Assistant Examiner—Nina Bhat
Attorney, Agent, or Firm—Oblon, Spivak, McClelland, Maier & Neustadt

[57] ABSTRACT

In order to enhance the efficiency of an ozone generator it is proposed that its outer electrodes (1,2) are formed essentially as metal plates arranged and separated from one another in pairs, between which a tube (3) or a layer of closely-spaced tubes (3) with a diameter corresponding to the separation of the metal plates lies. The tubes (3) have an outer coating of dielectric material, or themselves consist of such, and possess in each case an inner electrode (4) of an electrically conductive material.

Despite a comparatively inhomogeneous discharge gap (6), such an ozone generator has a high efficiency of ozone generation because the heat arising in the discharge space can be dissipated optimally.

12 Claims, 2 Drawing Sheets

OZONE GENERATOR

BACKGROUND OF THE INVENTION

1. Field of the Invention

The invention relates to an ozone generator comprising an outer electrode and a plurality of inner electrodes which have a dielectric coating on their outer surfaces, discharge gaps between the outer electrode and the dielectric coating, and an alternating current source connected to the outer and inner electrodes.

Ozonizers of this type are known, for example, from Swiss Pat. No. 648,534.

2. Discussion of Background

As a result of the increasing use of ozone for chemical and physical purposes, in the recent past the ozone tube which goes back to work done by us at Siemens has been decisively improved from the technical and economic point of view. Thus, it is proposed in U.S. Pat. No. 2,811,217 to enhance the ozone yield by requiring that specific characteristics of the ozonizer (frequency of the supply voltage, dielectric constant of the dielectric material, amplitude of the supply voltage, thickness of the dielectric coating and size of the discharge gap) fulfill specific regularities.

In other publications, special cooling measures are proposed for the same purpose in order to enhance the ozone yield, thus, e.g. alongside the liquid cooling of the outer electrode, internal cooling of the high-voltage electrode with gas or liquid in German Offenlegungsschrift No. 2,357,392, or intermediate cooling of the ozone-enriched gas employed in the case of series-connected ozonizers in German Offenlegungsschrift No. 2,436,914.

It is generally known that by reducing the discharge gap width in a tubular ozone generator the mean temperature in the discharge gap can be reduced. It can be shown theoretically and experimentally that the mean temperature in the discharge gap is proportional to its gap width. A low temperature in the discharge gap is desired because in this way the efficiency of the ozone generation can be markedly improved.

Today, discharge gap widths of around 1 mm are prior art. A further reduction of the gap width comes up against the geometrical tolerances of the metal tubes and dielectric tubes which are employed. Especially with sizable tube lengths, a further reduction in the gap width is limited by the always present flexures of the dielectric tubes and metal tubes.

With the aim of enhancing and rendering uniform the intensities of the field strength, it is proposed in German Offenlegungsschrift No. 3,422,989 to form the inner electrode as a solid metal rod. Because the diameter of the rod is small by comparison with a tube, the field strength at its surface is high. Since, in addition, the diameter of the outer electrode is correspondingly diminished and low material thicknesses are employed, the result is an elastic construction. The distance between outer and inner electrode and dielectric can be maintained very precisely over the entire length. The result of this is uniform intensity of the field strength, good cooling possibilities, compact construction and high power.

SUMMARY OF THE INVENTION

Accordingly, one object of this invention is to provide a novel ozone generator which is distinguished by compact construction, high efficiency and high ozone concentration.

To achieve this object with an ozone generator of the generic concept named at the beginning it is provided according to the invention that the outer electrodes are formed essentially as metal plates arranged and separated from one another in pairs, between which a tube or a layer of closely-spaced tubes with a diameter corresponding to the separation of the metal plates lies, the tubes having an outer coating of dielectric material and in each case an inner electrode of an electrically conductive material.

According to a first embodiment, the inner electrode is a metal film on the inner wall of a tube of dielectric material closed at one end, e.g. a glass tube with a circular cross-section, the result being an ozone generator which with reference to the geometry of the discharge gap differs completely from the classical ozone generators: the discharge spaces are now channels running in the longitudinal tube direction, which are bounded in each case by two adjacent outer tube walls and the metal plate, and thus have a sickle-shaped cross-section.

Against expectation, the efficiency of the ozone generator is very high despite an inhomogeneous discharge gap, because the heat arising in the gap due to the discharges is dissipated, on the one hand, largely via the metal plates and, on the other hand, via the dielectric (glass) to the metal plates.

The efficiency of the ozone generator is very high despite an inhomogeneous discharge gap, because the heat arising in the gap due to the discharges is dissipated, on the one hand, largely via the metal plates and, on the other hand, via the dielectric (glass) to the metal plates.

In a second embodiment, instead of metal films there are provided in the open dielectric tubes separate inner electrodes, which are formed either as wire helixes or as flattened metal rods with, for example, a lens-shaped cross-section. In the case of the latter, the flat sides of the electrodes run parallel to the outer electrodes.

In each of these two variants, the free spaces between the electrodes and the dielectric tubes can be filled up with a suitable dielectric, or directly cast inner electrodes are provided, e.g. with plastic dielectric or insulated wires.

A further improvement of the heat transfer from the discharge gap(s) can be achieved by pushing metal rods or dielectric rods into the discharge spaces between the outer electrodes and the dielectric tubes. Again, the outer electrode can have a form such that, e.g., the said metal rods are formed in one piece with the outer electrodes.

Alongside tubes with circular cross-section, there is also possible an embodiment with dielectric tubes having a polygonal cross-section, these tubes then expediently consisting of ceramic or a plastic dielectric, and having either an inner metallic coating or a separate high-voltage electrode (helix, flattened metal plate).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
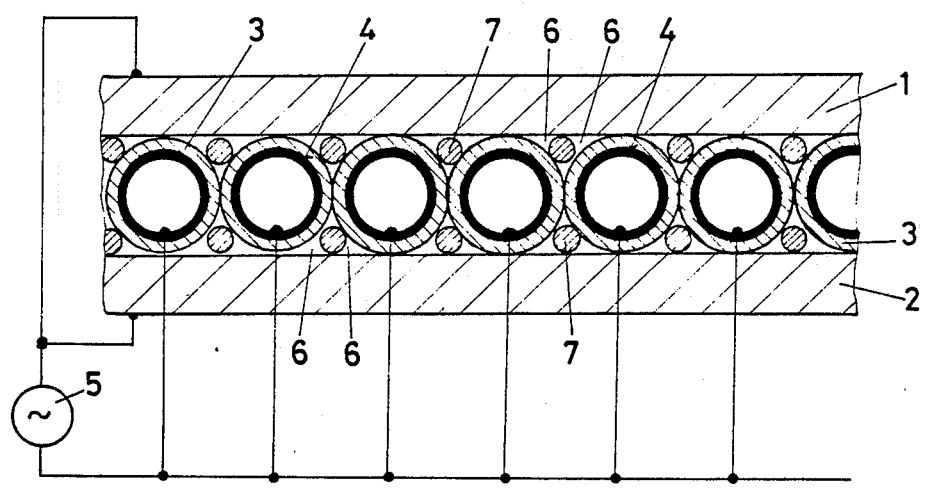
FIG. 1 shows a first illustrative embodiment of an ozone generator with internally metallized glass tubes.

Referring now to the drawings, wherein like reference numerals designate identical or corresponding parts throughout the several views, in FIG. 1 the ozone generator comprises two distanced metal plates 1,2, which form the outer electrodes. Between the metal plates 1,2 there lies a layer of closely-spaced glass tubes 3, the outer diameter of which corresponds to the separation of the metal plates 1,2. The glass tubes have a circular cross-section, and are provided at the inner wall with a metal film 4. This forms the inner electrode. The outer diameter of the glass tubes 3 is typically between 3 and 15 mm, the wall thickness amounts typically to 1 mm. An alternating current source with adjustable output voltage (typically several kV to 20 kV) and frequency (50 Hz to 10 kHz) is connected with one terminal to both outer electrodes 1,2 and with the other terminal to all inner electrodes 4.

The contacting with the inner electrodes takes place conventionally via contact brushes (not represented) of known design. The silent electrical discharge is formed in the spaces 6 delimited by the glass tubes 3 and the metal plates 1 or 2.

The cooling of the ozone generator takes place primarily through a cooling liquid, which flows along the outer faces of the metal surfaces. In order to improve the heat transfer from the discharge space to the metal plates 1,2, which is in any case already good, rods 7 of metal, glass or another dielectric material are inserted into the discharge gap 6. These rods are to touch the glass tubes 3 and also the metal plates 1,2 in as linear a fashion as possible.

Further intensification of the cooling can take place through a gas or an electrically non-conductive liquid, which is conducted through the glass tubes 3. Such measures are to be counted among the prior art and therefore require no further explanation within the framework of this application.

Figure 2:
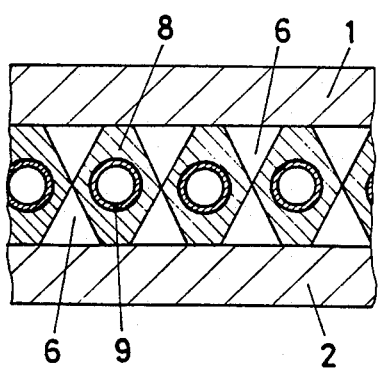
FIG. 2 shows a second illustrative embodiment of an ozone generator with internally metallized ceramic tubes having a polygonal cross-section.

Instead of glass tubes having a circular cross-section, it is also possible to use dielectric tubes of other materials, e.g. ceramic tubes. FIG. 2 shows such a variant with ceramic tubes 8 having a hexagonal cross-section. Such tubes can be fabricated with the required accuracy to shape using prior-art means, e.g. in an extrusion process. At the inner wall, the ceramic tubes 8 each have a metallic coating 9. Corresponding to the illustrative embodiment according to FIG. 1, it is possible here, too, for rods (not drawn in) to be pushed into the discharge spaces 6 in order to improve the heat transfer. Cooling takes place in the same way as for the arrangement according to FIG. 1.

Instead of internally metallized tubes according to FIGS. 1 and 2, it is also possible to use dielectric tubes with separate inner electrodes.

Figure 3:
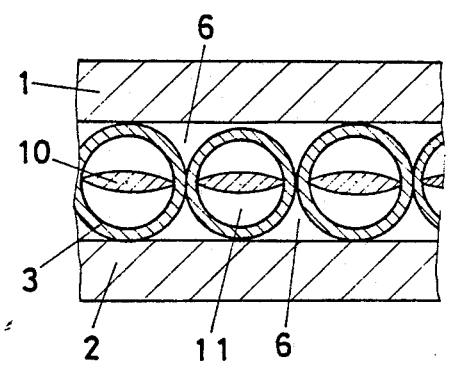
FIG. 3 shows a third illustrative embodiment of an ozone generator having glass tubes and separate metal electrodes in the form of flattened rods.

A first illustrative embodiment of such an arrangement is illustrated in FIG. 3. Inserted into the glass tubes 3 are flattened metal electrodes 10 of lens-shaped cross-section, the broad faces of which run parallel to the metal electrodes 1,2, and the largest diameter of which corresponds to the inner diameter of the glass tubes 3. In this embodiment, there are formed inner discharge spaces 11 and outer discharge spaces 6, which are electrically in series.

Figure 4:
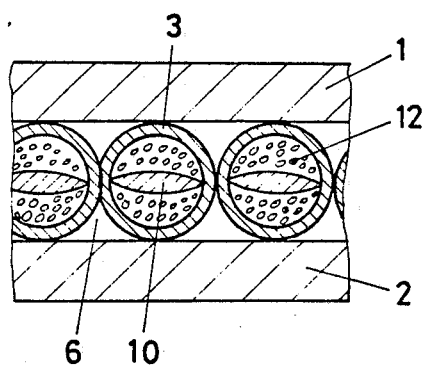
FIG. 4 shows a modification of FIG. 3 with inner discharge gaps, which are filled up with a dielectric.

If it is desired to dispense with these additional discharge spaces, the free space between the metal electrode 10 and the glass tube 3 can be filled up with a dielectric filler 12, as is illustrated in FIG. 4.

Figure 5:
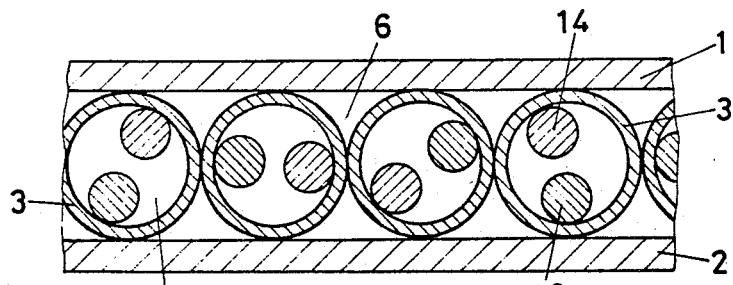
FIG. 5 shows a fourth illustrative embodiment of an ozone generator with separate inner electrodes in the form of wire helixes, in cross-section.
Figure 6:
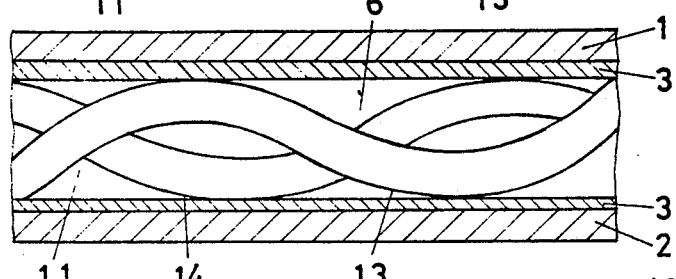
FIG. 6 shows a longitudinal section through the ozone generator according to FIG. 5.

However, instead of the flattened electrodes, the inner electrode is preferably embodied as a single-turn or multiple-turn wire helix 13,14 or wire spiral with only one drawn-in wire, as is represented in FIGS. 5 and 6. These are drawn prestressed into the glass tubes or dielectric tubes 3, and lie on the inner tube wall in a punctiform or linear fashion. This embodiment allows the use of dielectric tubes of very small diameter and correspondingly small wall thicknesses. Thus, glass tubes with an outer diameter of 4 mm and a wall thickness of approximately 1 mm were successfully tested experimentally. Here, too, an inner and an outer discharge space are present, it being possible, by analogy with FIG. 4, for the former to be filled up with a dielectric filler (not drawn in in FIGS. 5 or 6).

Without filler, the preferably multiple-turn wire helix causes an intensive mixing and better cooling of the gas flowing through the tube interior.

Figure 7:
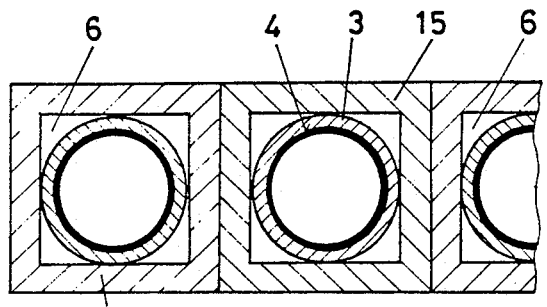
FIG. 7 shows a modification of the ozone generator according to FIG. 1 with rectangular tubes as outer electrodes.

As is illustrated in FIG. 7, the concept according to the invention can be modulated down to the smallest unit. There, a glass tube 3 provided with an inner metallic coating 4 is pushed, in each case, into a metal tube 15, the metal tubes 15 being closely packed and serving as outer electrodes.

Figure 8:
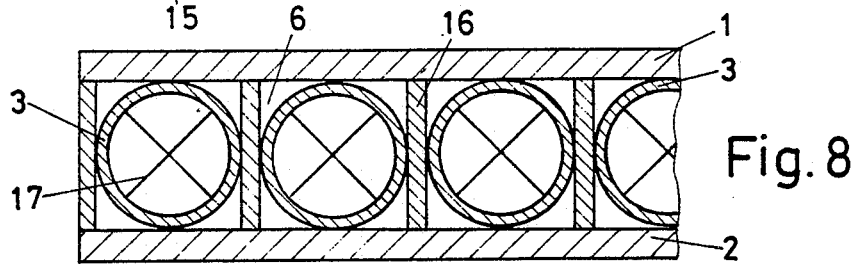
FIG. 8 shows a further modification of the ozone generator according to FIG. 1 with plate-shaped, outer electrodes and distance pieces lying therebetween.

Instead of metal tubes with a square cross-section, it is also possible to use tubes with a rectangular cross-section, which in one dimension have the clear width of a dielectric tube, and in the other dimension an integral multiple of the outer tube diameter. It is also possible to use honeycomb-like configurations according to FIG. 8, where in each case a thin web 16 lies between a dielectric tube 3 (in the case of the example) and the adjacent one. In this case, a separate inner electrode is provided in the form of a four-legged profile rod 17 which, given the omission of the inner metallic coating 4 in FIG. 7, can also be used in that case.

Naturally, in a manner analogous to FIG. 1, in all the illustrative embodiments represented in FIGS. 3 to 8, in order to improve the heat dissipation it is possible to push a rod of metal or of a dielectric material into the outer discharge space 6.

Figure 9:
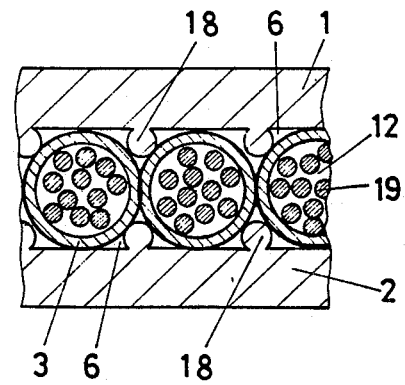
FIG. 9 shows a further modification of the ozone generator according to FIG. 1 with plate-shaped outer electrodes having projections pointing into the discharge space.

Instead of separate rods, it is also possible to provide projections 18, which are embodied in one piece with the outer electrodes 1,2 and project into the discharge spaces 6 and touch the glass tubes or dielectric tubes 3 in as linear a fashion as possible, as is represented in FIG. 9 by way of example. It is further illustrated in this figure that the inner electrode can also be embodied as a wire bundle 19, consisting of a multiplicity of individual wires 19, it being possible, analogous to FIG. 4, for the space remaining in the interior of the tube 3 to be filled up with a dielectric filler 12.

Instead of a smooth rod, it is also possible to provide in the outer discharge space 6 means for the periodic constriction of the flow cross-section, e.g. by introducing a "pearl necklace" with spacings of a few centimeters between the "pearls", the "pearls" consisting of an arbitrary, but ozone-resistant material.

Figure 10:
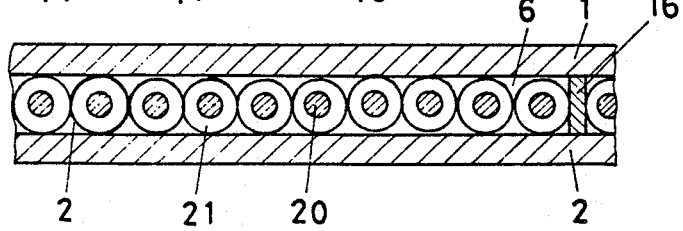
FIG. 10 shows a further modification of the ozone generator according to FIG. 1 with plate-shaped outer electrodes and insulated high-voltage wires as inner electrode, the wire insulation forming the dielectric.

Finally, FIG. 10 shows a variant of the invention which is distinguished by an extremely simple and economic construction. Pushed in between two metal plates 1,2, which serve as outer electrodes and are separated by distance pieces 16, are high-voltage wires consisting of a metallic core 20 and an insulating covering 21. The wire core 20 serves as inner electrode, while the insulating current 21 serves as dielectric tube. The discharge spaces 6 lie, in each case, between the high-voltage wires, which are as closely spaced as possible, and the metal plates 1 or 2.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. Ozone generator comprising:
    a pair of metal planar plates serving as outer electrodes separated from one another;
    a tube having an outer dielectric layer with an outer dimension corresponding to the separation between said plates and an inner electrically conductive material serving as an inner electrode;
    said tube and said planar plates defining an inhomogeneous discharge gap between a portion of said tube and said planar plates not in contact with each other; and
    an alternating current source connected to said inner and outer electrodes for applying a voltage across said inner and outer electrodes and thereby producing an electrical discharge in said inhomogeneous discharge gap to produce ozone.

2. Ozone generator according to claim 1, comprising:
    a plurality of said tubes arranged closely-spaced between said planar plates, each of said tubes defining an inhomogeneous discharge gap between the respective tube and said planar plates.

3. Ozone generator as claimed in claim 1, wherein the outer dielectric layer of the tube is selected from a material consisting of glass, ceramics and a plastic dielectric, and the inner electrode of the tube is selected from the group consisting of an inner metallic coating and a metallic conductor which fills up the tube cross-section.

4. Ozone generator as claimed in claim 1, wherein the outer dielectric layer of the tube consists of a material selected from the group consisting of glass and ceramics, and said inner electrically conductive material comprises a separate metallic inner electrode.

5. Ozone generator as claimed in claim 4, wherein said inner electrically conductive material comprises a flat rod having a broad face which runs approximately parallel to the metal plates.

6. Ozone generator as claimed in claim 4, wherein said inner electrically conductive material is selected from the group consisting of a single-turn wire helix, a multiple-turn wire helix and a wire spiral.

7. Ozone generator as claimed in claim 3, wherein the outer dielectric layer of the tube has a polygonal cross-section having at least one face contacting at least one of said outer electrodes.

8. Ozone generator as claimed in claims 1, 2, 3, 4, 5, 6 or 7, comprising:
    at least one rod arranged in said inhomogeneous discharge gap between the tube and at least one of the outer electrodes, said rod touching the outer electrode and/or the tube at least partially in a punctiform or linear fashion.

9. Ozone generator according to claims 1, 2, 3, 4, 5, 6 or 7, comprising:
    at least one of said outer electrodes having projections which extend into said inhomogeneous discharge gap.

10. Ozone generator as claimed in claims 1, 2, 3, 4, 5, 6 or 7, comprising:
    means for the periodic constriction of the flow cross-section inserted in a discharge space between the tube and at least one outer electrode.

11. Ozone generator as claimed in claims 4, 5, 6 or 7, comprising:
    a dielectric filler separating the dielectric layer from the conductive materials serving as said inner electrode.

12. Ozone generator as claimed in claims 1, 2, 3, 4, 5, 6 or 7, comprising:
    distance webs separating said metal plates and joining said metal plates to each other.

* * * * *